(12) United States Patent
Fox et al.

(10) Patent No.: US 11,689,601 B1
(45) Date of Patent: Jun. 27, 2023

(54) STREAM QUALITY ENHANCEMENT

(71) Applicant: INTERNATIONAL BUSINESS MACHINES CORPORATION, Armonk, NY (US)

(72) Inventors: Jeremy R. Fox, Georgetown, TX (US); Martin G. Keen, Cary, NC (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/807,398

(22) Filed: Jun. 17, 2022

(51) Int. Cl.
*H04L 65/80* (2022.01)
*H04N 21/647* (2011.01)
*H04L 65/75* (2022.01)

(52) U.S. Cl.
CPC ............ *H04L 65/80* (2013.01); *H04L 65/762* (2022.05); *H04N 21/647* (2013.01)

(58) Field of Classification Search
CPC ...... H04L 65/80; H04L 65/762; H04N 21/647
See application file for complete search history.

(56) References Cited

U.S. PATENT DOCUMENTS

| 7,949,775 B2* | 5/2011 | Virdi | H04N 21/6373 709/233 |
|---|---|---|---|
| 9,313,138 B2 | 4/2016 | Sun | |
| 10,687,122 B2 | 6/2020 | Schmidmer | |
| 10,812,831 B2* | 10/2020 | Chao | H04N 19/132 |
| 11,209,442 B2 | 12/2021 | Winn | |
| 2007/0091997 A1* | 4/2007 | Fogg | H04N 19/102 375/E7.176 |
| 2018/0075581 A1 | 3/2018 | Shi | |
| 2019/0098067 A1* | 3/2019 | Sandoval | H02J 13/00024 |

(Continued)

FOREIGN PATENT DOCUMENTS

WO WO-2022245434 A1 * 11/2022 ........... G06N 3/0454

OTHER PUBLICATIONS

Brownlee,. A Gentle Introduction to Generative Adversarial Networks (GANs), Machine Learning Mastery, Generative Adversarial Networks, Jul. 19, 2019, 32 Pgs, <https://machinelearningmastery.com/what-are-generative-adversarial-ne . . . >.

(Continued)

*Primary Examiner* — Javier O Guzman
(74) *Attorney, Agent, or Firm* — James L. Olsen

(57) ABSTRACT

Aspects of the present disclosure relate to stream quality enhancement. A determination can be made that quality of an audio/video (A/V) stream being streamed to a first device falls below a quality threshold. A plurality of edge processing devices in an environment of the first device can be identified. Available computing resources of each of the edge processing devices can be determined. At least one edge processing device of the plurality of edge processing devices with sufficient computing resources for correcting quality of the A/V stream using a correction model can be selected. The selected at least one edge processing device can be instructed to correct the A/V stream using the correction model to generate a corrected A/V stream that satisfies the quality threshold. A command to transmit the corrected A/V stream to the first device can be issued.

18 Claims, 6 Drawing Sheets

(56) References Cited

U.S. PATENT DOCUMENTS

| | | | | |
|---|---|---|---|---|
| 2020/0050879 | A1* | 2/2020 | Zaman | G06V 10/993 |
| 2020/0349682 | A1 | 11/2020 | Mayol Cuevas | |
| 2021/0092493 | A1* | 3/2021 | Codenie | H04H 60/372 |
| 2021/0158570 | A1* | 5/2021 | Mohandoss | G06V 20/46 |
| 2021/0326312 | A1* | 10/2021 | White | G06N 20/00 |
| 2021/0329306 | A1* | 10/2021 | Liu | H04N 19/20 |
| 2021/0343305 | A1* | 11/2021 | Jin | G10L 21/02 |
| 2021/0374483 | A1* | 12/2021 | Kudo | G06V 10/82 |
| 2021/0392175 | A1* | 12/2021 | Gronau | H04L 65/403 |
| 2022/0122360 | A1* | 4/2022 | Singh | G06T 5/00 |
| 2022/0237368 | A1* | 7/2022 | Tran | G06N 3/045 |
| 2022/0366193 | A1* | 11/2022 | Luo | G06N 3/045 |

OTHER PUBLICATIONS

Disclosed Anonymously, "Profile Development to Predict Content Adaptations", An IP.com Prior Art Database Technical Disclosure, IP.com No. IPCOM000265736D, May 11, 2021, 5 Pgs.

Disclosed Anonymously, "User Profile and Relationship Graph Analysis Based Personalized Audio-Visual Speed Control and Summarization" An IP.com Prior Art Database Technical Disclosure, IP.com No. IPCOM000268730D, Feb. 21, 2022, 5 Pgs.

Disclosed Anonymously., "Improving Advertisement Delivery in Video Streaming", An IP.com Prior Art Database, Technical Disclosure, IPCOM000251993D, Dec. 13, 2017, 37 Pgs.

IBM, "Accelerator—Use the Predictive Power of AI to Deliver Personalized Digital Ads That Exceed Your Campaign Goals", Access Apr. 29, 2022, 14 PGS, <https://www.ibm.com/products/watson-advertising-accelerator>.

IBM, "IBM Announces New Edge Partners, Technology and Solutions to Drive",Accessed Apr. 29, 2022, 10 PGS, <https://www.ibm.com/cloud/edge-application-manager>.

McCarthy et al.,"Sharp or Smooth? Comparing the Effects of Quantization Vs. Frame Rate for Streamed Video", Department of Computer Science, University College London, Uploaded by Angela Sasse on Apr. 29, 2014, 9 Pgs.<{j.mccarthy,a sase, d miras}@cs.ucl.ac uk>.

Mell et al., "The NIST Definition of Cloud Computing", National Institute of Standards and Technology, Special Publication 800-145, Sep. 2011, 7 pages.

Mohammadi et al.; "Deep Learning for IoT Big Data and Streaming Analytics: a Survey" IEEE Communications Surveys & Tutorials, vol. X, No. X, XXXXX 201X, arXiv:1712.04301v2 [cs.NI] Jun. 5, 2018, 40 Pgs.

* cited by examiner

STREAM QUALITY ENHANCEMENT

BACKGROUND

The present disclosure relates generally to the field of computing, and in particular, to stream quality enhancement.

Streaming is a method of content delivery where multimedia content (audio/video (A/V) data) is transmitted to a client device with little to no intermediate storage within network elements. Video streaming can allow users to communicate in real-time over the internet (e.g., via online web-conference software). A variety of streaming services are available for users, including, among others, on demand video streaming services, music streaming services, and video game live streaming services.

SUMMARY

Embodiments of the present disclosure are directed to a method, system, and computer program product for stream quality enhancement. A determination can be made that quality of an audio/video (A/V) stream being streamed to a first device falls below a quality threshold. A plurality of edge processing devices in an environment of the first device can be identified. Available computing resources of each of the edge processing devices can be determined. At least one edge processing device of the plurality of edge processing devices with sufficient computing resources for correcting quality of the A/V stream using a correction model can be selected. The selected at least one edge processing device can be instructed to correct the A/V stream using the correction model to generate a corrected A/V stream that satisfies the quality threshold. A command to transmit the corrected A/V stream to the first device can be issued.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
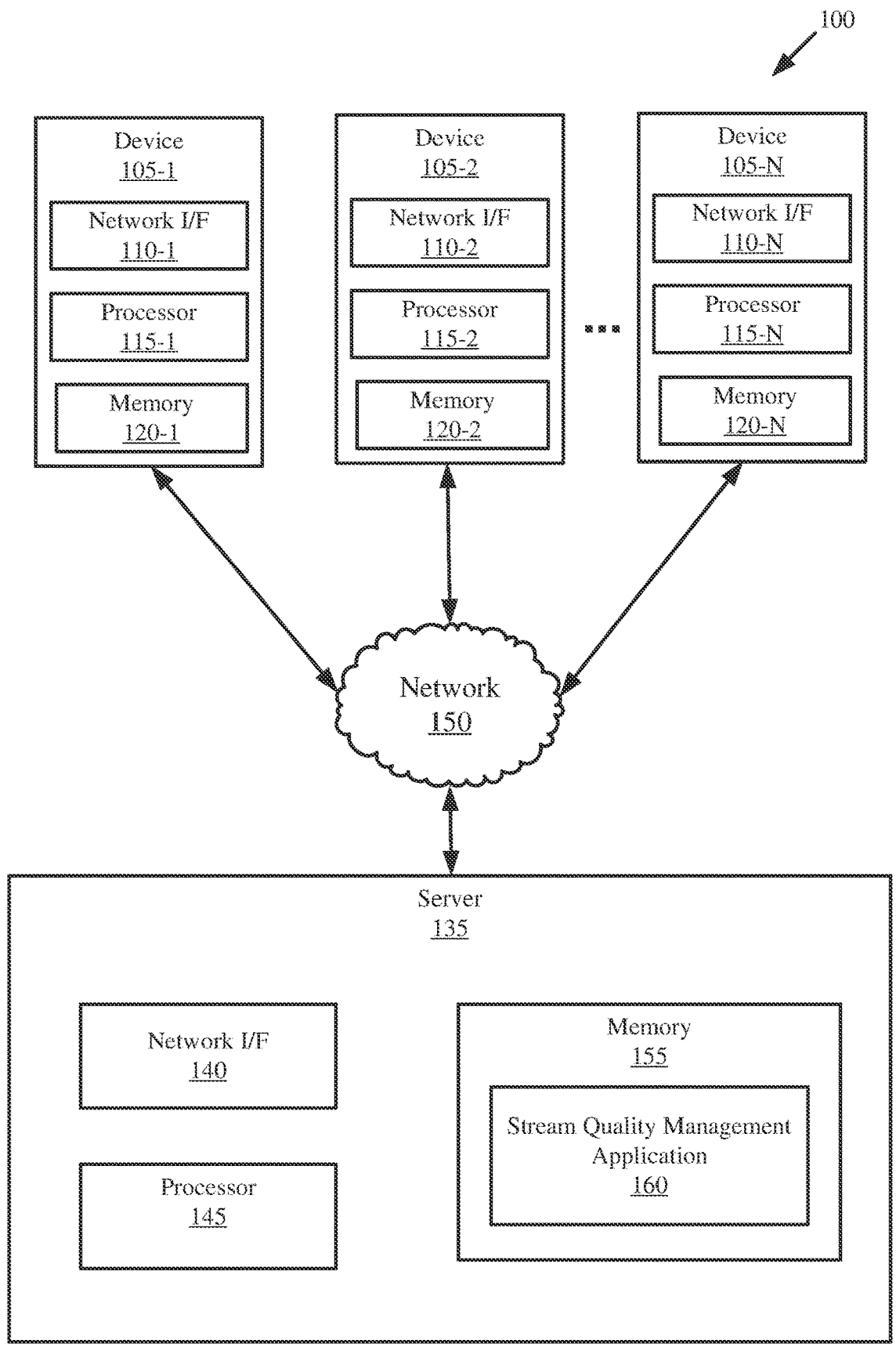
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and in particular, to stream quality enhancement. While the present disclosure is not necessarily limited to such applications, various aspects of the disclosure can be appreciated through a discussion of various examples using this context.

Streaming is a method of content delivery where multimedia content (audio/video (A/V) data) is transmitted to a client device with little to no intermediate storage within network elements. Video streaming can allow users to communicate in real-time over the internet (e.g., via online web-conference software). A variety of streaming services are available for users, including, among others, on demand video streaming services, music streaming services, and video game live streaming services.

Complications are common within streaming environments. For example, users who lack sufficient bandwidth may experience stops, lag, buffering, and other network related issues. Further, users who lack sufficient hardware or software systems may be unable to stream certain content or achieve acceptable stream quality (e.g., high resolution/ frame rate). Solutions today typically address poor bandwidth by dynamically reducing resolution, lowering bit rate, and/or reducing frame rate. Each solution results in a lower bandwidth requirement but also reduces the stream quality. For example, users may have difficulty interpreting audio/video (A/V) data received from a streaming service due to a lower frame rate or resolution.

Aspects of the present disclosure relate to stream quality enhancement. A determination can be made that quality of an audio/video (A/V) stream being streamed to a first device falls below a quality threshold. A plurality of edge processing devices in an environment of the first device can be identified. Available computing resources of each of the edge processing devices can be determined. At least one edge processing device of the plurality of edge processing devices with sufficient computing resources for correcting quality of the A/V stream using a correction model (e.g., a generative adversarial network (GAN) model) can be selected. The selected at least one edge processing device can be instructed to correct the A/V stream using the correction model to generate a corrected A/V stream that satisfies the quality threshold. A command to transmit the corrected A/V stream to the first device can be issued.

Aspects of the present disclosure provide various improvements. By identifying a low quality stream (e.g., a stream that falls below a quality threshold) and correcting the low quality stream, the quality of the stream received by the receiving device can be enhanced. That is, issues such as low resolution and frame rate can be corrected prior to receipt by the receiving device. Further, by utilizing edge processing devices in an environment (e.g., sharing a local wireless network) of the receiving device to correct the stream, the corrected stream can be transmitted to the receiving device with little delay (e.g., based on processing constraints). Further, if the hardware of the receiving device is insufficient to be able to receive acceptable stream quality, then hardware of edge processing devices (e.g., processing and memory hardware resources) can be utilized to enhance the stream for transmission to the receiving device. Further still, aspects of the present disclosure improve efficiency of stream quality enhancement. For example, because the correction model can utilize machine learning (e.g., neural networks, such as in a GAN model), processing and memory resources can be more efficiently utilized as the correction model is trained to more efficiently correct stream quality.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera), and/or any commercially available or custom software (e.g., browser software, communications software, server software, natural language processing software, search engine and/or web crawling software, image processing software, extended reality (XR) software, etc.). The devices 105 and/or the server 135 can be servers, desktops, laptops, financial transaction terminals, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 5.

The server 135 includes a stream quality management application 160. The stream quality management application 160 can be configured to enhance quality of audio/video (A/V) streams received by users (e.g., devices 105).

The stream quality management application 160 can be configured to monitor streams received by devices 105. For example, stream quality management application 160 can be configured to monitor resolution, frame rate, and/or bit rate of A/V data received by each device. Responsive to quality of an A/V stream received by a device (e.g., device 105-1) falling below a quality threshold (e.g., a frame rate, bitrate, or resolution threshold), the stream quality management application 160 can be configured to attempt to enhance the quality of the A/V stream that fell below the quality threshold.

Upon identifying an A/V stream with quality below a quality threshold, the stream quality management application 160 can be configured to identify edge processing devices in an environment (e.g., sharing a local network) of the device which received the low quality stream. Edge computing is a distributed computing paradigm that brings computation and data storage closer to sources of data. As discussed herein, edge processing devices refer to devices nearby (e.g., within a predetermined distance from, proximate to, sharing a wireless network with, etc.) a device receiving a low quality stream that can be configured to correct the low quality stream. As an example, the device 105-2 may be an edge processing device in a vicinity of device 105-1. Thus, if a low quality stream is received by device 105-1, edge processing device 105-2 can be configured to correct the low quality stream for the device 105-1. The edge processing devices may share a local network with the device receiving the low quality stream such that the corrected stream can be transmitted from the edge processing device to the device receiving the low quality stream with little to no delay (based on processing time).

Available computing resources of each edge processing device are determined by the stream quality management application 160. Available computing resources include available memory resources (e.g., currently available random access memory (RAM) memory based on current utilization and capacity), available processing resources (e.g., currently available central processing unit (CPU) and graphics processing unit (GPU) resources based on current utilization and capacity), and available network resources (e.g., current network speed/availability). The available computing resources of edge processing devices can be determined to attempt to identify one or more edge processing devices that can be configured to correct the low quality stream based on the current quality of the stream (e.g., the current bit rate, resolution, or frame rate) and transmit the stream back to the receiving device. If a determination is made that one or more suitable edge processing devices are capable of correcting the low quality stream (e.g., based on analyzed available computing resources with respect to the required amount of correction), then the stream quality management application 160 can be configured to select the one or more suitable edge processing devices for correcting the stream and transmitting a corrected A/V stream to the receiving device.

In embodiments, two or more edge processing devices can be selected to cooperatively correct the low quality stream. For example, if a single edge processing device does not have available computing resources to correct the low quality stream, two edge processing devices collectively having available computing resources to correct the low quality stream can be selected. Each edge processing device can be instructed to correct a portion of the A/V stream (e.g., a certain number of frames or portion of audio data), and the corrected portions can be collated/combined prior to transmission back to the receiving device as a corrected stream. Any suitable number of edge processing devices can be instructed to cooperatively correct an A/V stream (e.g., 3 edge processing devices, 5 edge processing devices, 10 edge processing devices, etc.).

The stream quality management application 160 can then be configured to instruct the selected edge processing device(s) to correct the low quality stream. Correcting the low quality stream can including running a correction model (e.g., a machine learning model) on the low quality stream (e.g., accessed by edge computing devices over a wireless network) to correct video, audio, and/or image data associated with the low quality stream. In embodiments, the correction model can be a generative adversarial network (GAN) configured to modify image data (e.g., enhance image resolution), generate image frames (e.g., to improve frame rate), enhance/correct audio data, and other types of processing to improve quality of the stream. The correction of the low quality stream can generate a corrected A/V stream that can be transmitted for playback on the receiving device. In embodiments, the corrected A/V stream may satisfy the quality threshold (e.g., exceed a resolution threshold, a frame rate threshold, or a bit rate threshold).

A GAN is a type of machine learning framework where a discriminator model (e.g., a first neural network) and a generator model (e.g., a second neural network) can be cooperatively coupled to learn in an unsupervised manner. The discriminator can be configured to determine whether an input (e.g., image/audio data generated by the generator) is real or fabricated, and a generator can be configured to attempt to "fool" the discriminator by generating input data (e.g., fabricated image/audio data) for the discriminator. In the context of the present disclosure, the generator component of the GAN can be configured to modify or generate audio/video (A/V) data associated with a low quality stream such that the low quality stream can be corrected (e.g., to generate a corrected A/V stream). That is, edge processing devices can be configured to run a correction model on the low quality stream to enhance the resolution and/or frame rate associated with video data and to enhance quality of audio data associated with the stream.

In embodiments, the GAN model can include a generator neural network parameterized by a first set of weights and biases trained to generate high resolution images using low resolution images as inputs. Additionally, in embodiments, the GAN model can include a discriminator neural network parameterized by a second set of weights and biases trained to discriminate high resolution images generated by the generator neural network from real image data (e.g., real high-resolution images). In this way, the generator neural network and discriminator neural network can be configured to generate high resolution images using low resolution images received in low quality streams as inputs. Thus, each low resolution frame received in an A/V stream by a device can be corrected using the GAN model to improve image resolution.

In embodiments, the GAN model can include a generator neural network parameterized by a first set of weights and biases trained to generate high quality audio data (e.g., high resolution audio data) using low quality audio data (e.g., low resolution audio data) as inputs. Additionally, in embodiments, the GAN model can include a discriminator neural network parameterized by a second set of weights and biases trained to discriminate high quality audio data generated by the generator neural network from real audio data (e.g., real high quality audio data). In this way, the generator neural network and discriminator neural network can be configured to generate high quality audio data using low quality audio data received in low quality streams as inputs. Thus, low quality audio data received in an A/V stream by a device can be corrected using the GAN model to improve audio quality.

GAN models can require extensive computing resources. Thus, utilizing nearby edge processing devices to perform correction for the device receiving the low quality stream can allow the stream to be corrected using nearby computing resources. Further, because the edge computing devices are nearby the device receiving the low quality stream (e.g., sharing a local wireless network), the stream can be corrected by the edge processing devices and transmitted to the device receiving the low quality stream in real-time with little delay (e.g., based on processing time constraints). However, in some embodiments, the stream can be corrected within a buffering period (e.g., 1 minute, 5 minutes, etc.) such that edge processing devices have sufficient time to correct the stream for playback on the receiving device.

The device originally receiving the low quality stream then receives the corrected stream from the one or more edge processing devices (e.g., over a local wireless network). Thus, the device now displays a higher quality version of the stream that was corrected using one or more correction models by the one or more edge processing devices.

Though reference is made to correcting a low quality stream using one or more edge processing devices nearby a device receiving the low quality stream (herein referred to as a "receiving device"), in embodiments, the receiving device can be configured to correct the low quality stream using its own computing resources. Thus, the stream quality management application 160 can be configured to select the receiving device to correct the low quality stream if a determination is made that the receiving device has sufficient computing resources to perform the correction itself. In these embodiments, models for correcting the low quality stream (e.g., GAN models) may be local to the receiving device.

Though reference is made to correcting A/V streams upon receipt by devices, in embodiments, A/V streams can be corrected prior to receipt by devices. For example, an A/V stream can be corrected while it is being streamed to a device but prior to receipt by the device. In these embodiments, one or more network elements, servers, edge processing devices, etc. can be configured to determine stream quality of the stream being streamed to the device and correct the stream prior to it being received by the device.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
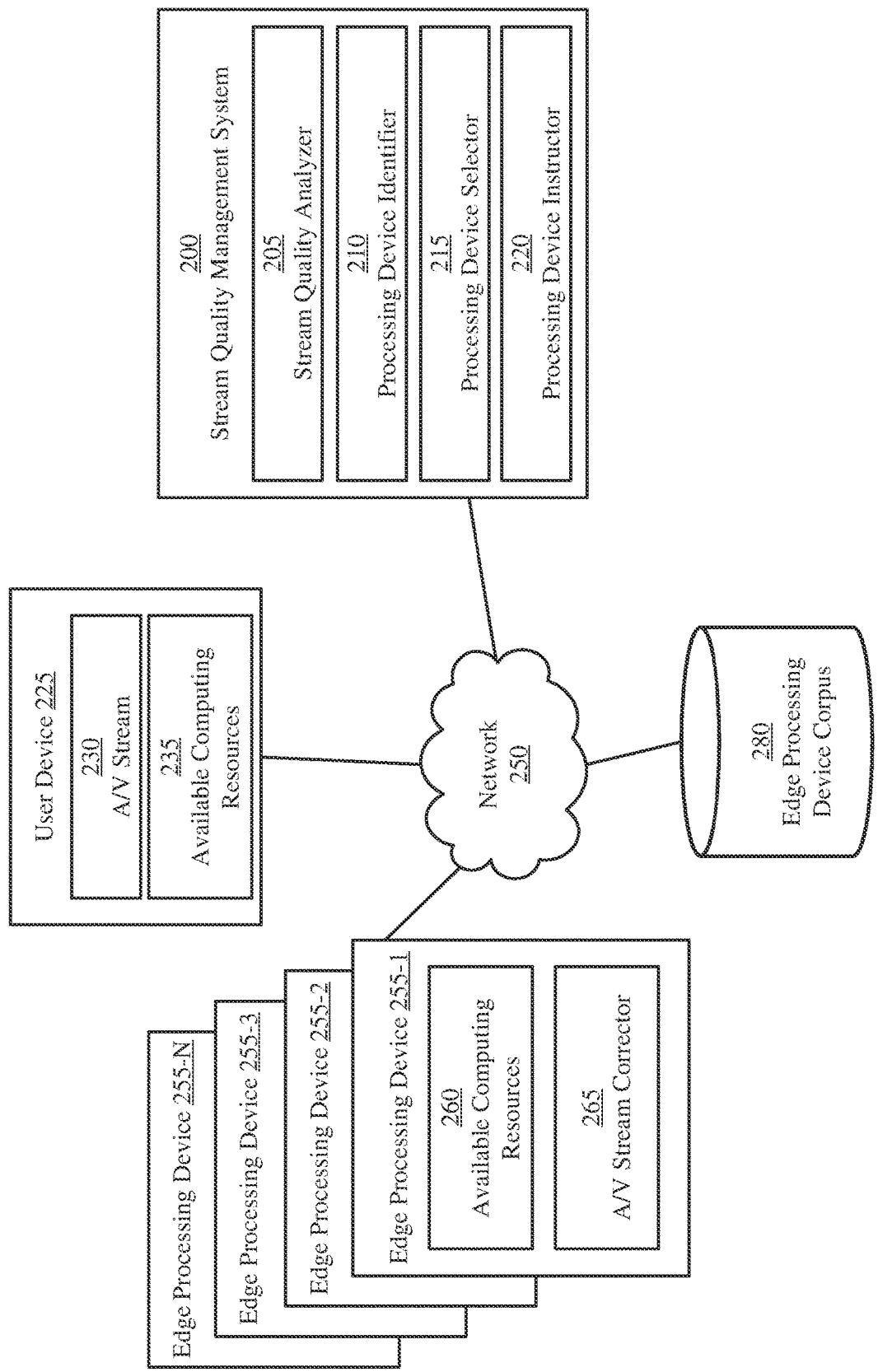
FIG. 2 is a block diagram illustrating an IoT environment, in accordance with embodiments of the present disclosure.

Referring now to FIG. 2, illustrated is a block diagram of an example Internet of Things (IoT) environment according to aspects of the present disclosure. The IoT environment can include numerous components communicatively coupled by a network 250, such as, but not limited to, a stream quality management system 200, a user device 225, edge processing devices 255-1, 255-2, 255-3 . . . 255-N (collectively referred to as edge processing devices 255), and an edge processing device corpus 280. The various components within the IoT environment can be processor executable instructions that can be executed by a dedicated or shared processor using received inputs.

The stream quality management system 200 (e.g., steam quality management application 160) can be configured to correct an A/V stream 230 received by the user device 225. The stream quality management system 200 includes a stream quality analyzer 205, a processing device identifier 210, a processing device selector 215, and a processing device instructor 220. The functionalities of the stream quality analyzer 205, processing device identifier 210, processing device selector 215, and processing device instructor 220 can be processor executable instructions that can be executed by a dedicated or shared processor using received inputs.

The stream quality analyzer 205 can be configured to analyze quality of the A/V stream 230 received by the user device 225. Analyzing stream quality can include determining a frame rate, resolution, and/or bit rate associated with the A/V stream 230 received by the user device 225. In embodiments, indicators for stream quality such as frame rate, resolution, and bit rate of the received A/V stream can be determined by the user device 225 and transmitted to the stream quality management system 200. In embodiments, indicators from stream quality can be received/analyzed by a streaming service, a broadcasting service, or a software application (e.g., third-party software) for analyzing quality of a received A/V stream. The stream quality analysis completed by the stream quality analyzer 205 can output a resolution of the A/V stream 230 (e.g., 480 p, 720 p, 1080 p, etc.), a framerate of the A/V stream 230 (30 frames per second (fps), 60 fps, 120 fps, etc.), and/or a bit rate (e.g., 2,500 kilobits per second (kbps), 5,000 kbps, 10,000 kbps, etc.) of the A/V stream 230.

The stream quality analyzer 205 can then be configured to compare the indicators of stream quality to one or more thresholds to determine whether the stream quality is acceptable. For example, the resolution, frame rate, and/or bit rate can be compared to a resolution threshold, frame rate threshold, and/or bit rate threshold. The thresholds can be set to dictate whether the stream quality is acceptable (e.g., above the threshold(s)) or unacceptable (e.g., below the threshold(s)). If the stream quality analyzer 205 determines that the stream quality is acceptable, then the stream quality can be continuously monitored to determine whether the stream quality remains acceptable or becomes unacceptable (e.g., low quality).

If the stream quality analyzer 205 determines that the A/V stream 230 quality is unacceptable (e.g., below a resolution threshold, frame rate threshold, and/or bit rate threshold), then the processing device identifier 210 can be configured to identify edge processing devices 255 nearby (e.g., sharing a wireless network with) the user device 225. The processing device identifier 210 can identify nearby edge processing devices 255 in any suitable manner. In some embodiments, nearby edge processing devices 255 can be determined based on devices sharing a wireless network (e.g., network 250) with user device 225. A list of devices sharing a wireless network with the user device 255 can be discovered by analyzing the wireless network, for example, using a wireless network management application (not shown). As an example, the processing device identifier 210 can be configured to identify edge processing devices 255-1, 255-2, and 255-3 based on a wireless network shared with user device 225. In some embodiments, edge processing devices 255 can be determined using IoT sensors (e.g., cameras) within an environment of the user device 255. In some embodiments, edge processing devices 255 can be identified based on a user-defined list of edge processing devices. However, the edge processing devices 255 can be identified in any other suitable manner.

In embodiments, identified edge processing devices can be stored within the edge processing device corpus 280. The edge processing device corpus 280 can be a datastore storing identities, available computing resources, and/or rankings of each edge processing device. The edge processing device corpus 280 can be accessed by the stream quality management system 200 for stream quality correction purposes. Edge processing device corpus 280 can be stored on any suitable storage medium (e.g., a hard disk drive (HDD) or solid state drive (SSD)), on any suitable location (e.g., on user device 225, on edge processing devices 255, on stream quality management system 200, etc.), and in any suitable format (e.g., a table or list).

The processing device selector 215 can be configured to determine available computing resources of the identified edge processing devices 255. For example, the first edge processing device 255-1 has respective available computing resources 260, the second edge processing device 255-2 has respective available computing resources (not shown), the third edge processing device 255-3 has respective available computing resources (not shown), etc. Determining available computing resources can include inspecting current execution/utilization of each edge processing device to determine available memory resources (e.g., random access memory (RAM)) based on currently utilized memory as compared to memory capacity) of each edge processing device, available processing resources (e.g., CPU and GPU availability) of each edge processing device, and available network resources (e.g., available network bandwidth) of each edge processing device. In embodiments, the available computing resources of each identified edge processing device can be stored within edge processing device corpus 280. That is, each respective device identity can include associated available computing resources stored within edge processing device corpus 280. The computing resources of each edge processing device can be updated within edge processing device corpus 280 as available computing resources change over time.

In embodiments, available computing resources 235 of the user device 225 can be determined. This can be completed such that, if no edge processing devices are identified and/or if the user device 225 has sufficient available computing resources 235 to correct the A/V stream 230, then the user device 225 can be selected to correct the A/V stream.

The processing device selector 215 can then be configured to select one or more edge processing devices having available computing resources to correct the low quality stream received by the user device 225. For example, the edge processing device selector can be configured to determine a minimum amount of memory resources, processing resources, and/or network resources required to successfully correct the A/V stream 230 and transmit the corrected A/V stream 230 for playback on user device 225. Thereafter, the processing device selector 215 can be configured to select one or more edge processing devices which fulfill the minimum amount of memory resources, processing resources, and/or network resources required to successfully correct the A/V stream 230 and transmit the corrected A/V stream 230 for playback on user device 225. The minimum amount of computing resources can consider the current quality of the A/V stream 230 as well as the amount of resources required by a correction model configured to correct the A/V stream 230.

In embodiments, if no edge processing devices are identified and/or if the user device 225 has sufficient available computing resources 235 to correct the A/V stream 230, then the user device 225 can be selected to correct the A/V stream.

In embodiments, the edge processing devices 255 can be ranked based on available computing resources. For example, a highest ranked edge processing device can have the highest amount of available memory resources, processing resources, and/or network resources. In this example, the highest ranked edge processing device(s) with sufficient computing resources to correct the A/V stream 230 and transmit the corrected A/V stream 230 to the user device 225 can be selected by processing device selector 215. In embodiments, rankings of edge processing devices 255 can be stored with edge processing device corpus 280.

The processing device instructor 220 can be configured to instruct the selected edge processing device(s) to correct the A/V stream. For example, if edge processing device 255-1 was selected by processing device selector 215, an A/V stream corrector 265 can be configured to correct audio and/or video data associated with the A/V stream 230. Thereafter, the edge processing device 255-1 can transmit the corrected A/V stream over the network 250 (e.g., a local wireless network) to the user device 225 for playback. A/V stream correction can be completed by a correction model configured to enhance resolution and/or frame rate of video data and/or quality of audio data.

In embodiments, the A/V stream corrector 265 can include a generative adversarial network (GAN) model configured to modify image data (e.g., enhance image resolution), generate image frames (e.g., to improve framerate), enhance/correct audio data, and other types of processing to improve quality of the stream. The correction of the low quality A/V stream 230 can generate a corrected A/V stream that can be transmitted for playback on the user device 225. In embodiments, the corrected A/V stream may satisfy the quality threshold (e.g., exceed a resolution threshold, a frame rate threshold, or a bit rate threshold).

A GAN is a type of machine learning framework where a discriminator model (e.g., a first neural network) and a generator model (e.g., a second neural network) can be cooperatively coupled to learn in an unsupervised manner. The discriminator can be configured to determine whether an input (e.g., image/audio data generated by the generator) is real or fabricated, and a generator can be configured to attempt to "fool" the discriminator by generating input data (e.g., fabricated image/audio data) for the discriminator. In the context of the present disclosure, the generator component of the GAN can be configured to modify or generate audio/video (A/V) data associated with low quality A/V stream 230 such that the low quality A/V stream 230 can be corrected. That is, edge processing devices 255 can be configured to run a correction model on the low quality A/V stream 230 to enhance the resolution and/or frame rate associated with video data and to enhance quality of audio data associated with the stream.

In embodiments, the GAN model can include a generator neural network parameterized by a first set of weights and biases trained to generate high resolution images using low resolution images as inputs. Additionally, in embodiments, the GAN model can include a discriminator neural network parameterized by a second set of weights and biases trained to discriminate high resolution images generated by the generator neural network from real image data (e.g., real high-resolution images). In this way, the generator neural network and discriminator neural network can be configured to generate high resolution images using low resolution images received in low quality streams (e.g., A/V stream 230) as inputs. Thus, each low resolution frame received in the A/V stream 230 by device 225 can be corrected using the GAN model to improve image resolution. Aspects of the present disclosure recognize that the weights and biases of the generator and discriminator models can be updated over time based on training.

In embodiments, the GAN model can include a generator neural network parameterized by a first set of weights and biases trained to generate high quality audio data (e.g., high resolution audio data) using low quality audio data (e.g., low resolution audio data) as inputs. Additionally, in embodiments, the GAN model can include a discriminator neural network parameterized by a second set of weights and biases trained to discriminate high quality audio data generated by the generator neural network from real audio data (e.g., real high quality audio data). In this way, the generator neural network and discriminator neural network can be configured to generate high quality audio data using low quality audio data received in low quality streams as inputs. Thus, low quality audio data received in the A/V stream 230 by device 225 can be corrected using the GAN model to improve audio quality. Aspects of the present disclosure recognize that the weights and biases of the generator and discriminator models can be updated over time based on training.

GAN models can require extensive computing resources. Thus, utilizing nearby edge processing devices 255 to perform correction for the user device 225 can allow the stream to be corrected using nearby computing resources. Further, because the edge computing devices 255 are nearby the user device 225 (e.g., sharing a local wireless network), the stream can be corrected by the edge processing devices 255 and transmitted to the user device 225 in real-time with little delay (e.g., based on processing time constraints). However, in some embodiments, the A/V stream 230 can be corrected within a buffering period (e.g., 1 minute, 5 minutes, etc.) such that edge processing devices 255 have sufficient time to correct the stream for playback to the user device 225.

The processing device instructor 220 can then be configured to issue a command to transmit the corrected A/V stream 230 (e.g., corrected by A/V stream corrector 265) to the user device 225. In embodiments, the processing device instructor 220 can be configured to issue the command to transmit the corrected A/V stream to the user device 225 to the edge processing device that corrected the A/V stream. In embodiments, the stream quality management system 200 can request to obtain the corrected A/V stream and can thereafter transmit the corrected A/V stream to the user device 225.

It is noted that FIG. 2 is intended to depict the representative major components of example computing environment. In some embodiments, however, individual components can have greater or lesser complexity than as represented in FIG. 2, components other than or in addition to those shown in FIG. 2 can be present, and the number, type, and configuration of such components can vary.

Figure 3:
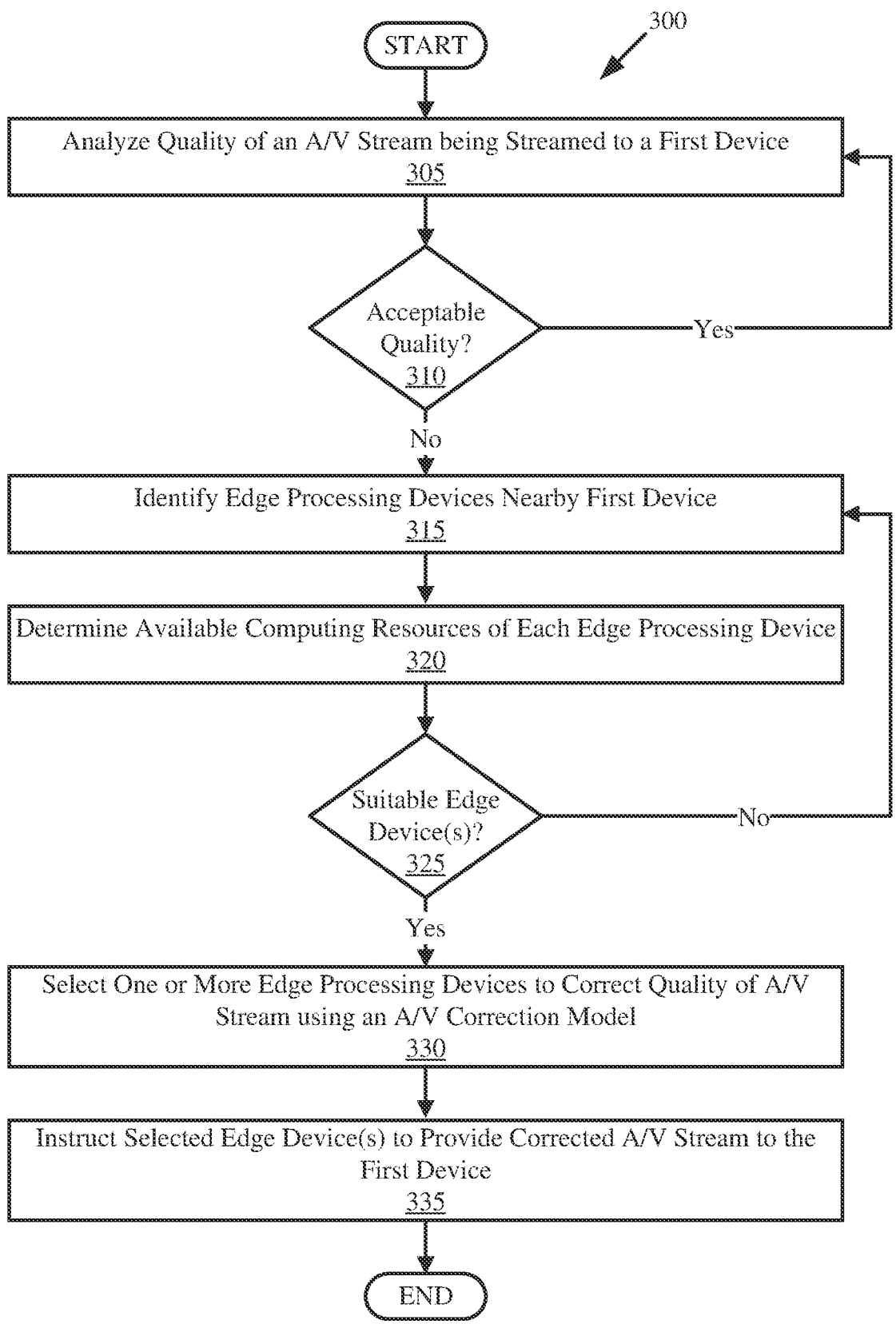
FIG. 3 is a flow-diagram illustrating an example method for stream quality enhancement, in accordance with embodiments of the present disclosure.

Referring now to FIG. 3, shown is a flow-diagram illustrating an example method 300 for stream quality enhancement (e.g., correction), in accordance with embodiments of the present disclosure. One or more operations of method 300 can be completed by one or more computing devices (e.g., devices 105, server 135, stream quality management system 200, user device 225, edge processing devices 255, edge processing device corpus 280, etc.).

Method 300 initiates at operation 305, where quality of an A/V stream being streamed to a first device (e.g., user device 225) can be determined. Determining quality of the A/V stream can include determining a resolution, frame rate, and/or bit rate of the A/V stream received by the first device. A determination is then made whether the A/V stream has an acceptable quality. This is illustrated at operation 310. Determining whether the A/V stream has an acceptable quality can be completed in the same, or a substantially similar manner, as described with respect to the stream quality analyzer 205 of FIG. 2. For example, determining whether the A/V stream has an acceptable quality can include comparing the resolution, frame rate, and/or bit rate of the A/V stream to a respective resolution threshold, frame rate threshold, and/or bit rate threshold.

If a determination is made that the stream quality satisfies the quality threshold (e.g., exceeds the resolution threshold, frame rate threshold, and/or bit rate threshold), then the quality of the A/V stream being streamed to the first device can continue to be analyzed (e.g., "Yes" at operation 310). In embodiments, the stream quality can continue to be analyzed intermittently, continuously, periodically, or over any suitable time interval. This can be completed to monitor to stream such that if the stream quality falls below an acceptable level, operations 310-335 for correcting the A/V stream can be triggered.

If a determination is made that the stream quality does not satisfy the quality threshold(s) (e.g., falls below the resolution threshold, frame rate threshold, and/or bit rate threshold), then edge processing devices nearby the first device can be identified (e.g., "No" at operation 310). This is illustrated at operation 315. Identifying edge processing devices can be completed in the same, or a substantially similar manner, as described with respect to the processing device identifier 210 of FIG. 2. For example, edge processing devices can be identified based on devices sharing a local wireless network with the first device.

Available computing resources of each identified edge processing device can be determined. This is illustrated at operation 320. Determining available computing resources of each edge processing device can be completed in the same, or a substantially similar manner, as described with respect to the edge processing device selector 215 of FIG. 2. For example, determining available computing resources can include determining available memory resources, processing resources, and/or network resources of each identified edge computing device.

A determination is then made whether there are one or more suitable edge processing devices with sufficient computing resources to correct the low quality A/V stream received by the first device. This is illustrated at operation 325. Determining whether there is one or more suitable edge processing devices with sufficient computing resources to correct the low quality A/V stream can be completed in the same, or a substantially similar manner, as described with respect to the processing device selector 215 of FIG. 2. For example, selection can include determining a minimum amount of memory resources, processing resources, and/or network resources required to correct the A/V stream and transmit the corrected A/V stream for playback on the first device. The minimum amount of computing resources required to correct the A/V stream can consider the current quality of the A/V stream (e.g., the current resolution, frame rate, or bit rate) and/or the amount of resources required by a correction model based on the current quality of the A/V stream.

If a determination is made that there are no suitable edge processing devices with sufficient computing resources to correct the low quality A/V stream received by the first device, then method 300 can return to operation 315 (e.g., "No" at operation 325). Thus, the method 300 can continue to (e.g., continuously, intermittently, periodically, etc.) identify edge processing devices nearby the first device until a suitable edge processing device is located. In some embodiments, if there are no suitable edge processing devices, a notification can be transmitted to the first device indicating that there are no suitable edge processing devices. This can prompt the user to "free up" computing resources of nearby edge processing devices such that stream correction can be completed. In some embodiments, if no suitable edge processing devices have sufficient computing resources to correct the stream, but the first device has sufficient computing resources to correct the stream, then the first device can be selected to correct the stream.

If a determination is made that there are one or more edge processing devices with sufficient computing resources to correct the low quality A/V stream received by the first device, then method 300 can proceed to operation 330 (e.g., "Yes" at operation 325), where the one or more edge processing devices with sufficient computing resources to correct the A/V stream are selected to correct quality of the A/V stream using a correction model. Correction of the A/V stream can be completed in the same, or a substantially similar manner, as described with respect to the processing device instructor 220 and/or A/V stream corrector 265 of FIG. 2. For example, correction of the A/V stream can be completed using a correction model, such as a GAN model. The correction model can be configured to correct image data associated with video frames and audio data associated with the A/V stream.

In embodiments, if two or more edge processing devices collectively have sufficient available computing resources to correct the low quality stream, then the two or more edge processing devices can be selected to cooperatively correct the A/V stream streamed to the first device. In these embodiments, audio/video data corrected by each of the two or more edge processing devices can be collated/combined prior to transmission to the first device.

The selected edge processing device(s) can then be instructed to provide the corrected A/V stream to the first device. This is illustrated at operation 335. For example, upon correction by a correction model (e.g., a GAN model), the edge processing device(s) which performed the correction can be instructed to transmit the corrected A/V stream to the first device.

The aforementioned operations can be completed in any order and are not limited to those described. Additionally, some, all, or none of the aforementioned operations can be completed, while still remaining within the spirit and scope of the present disclosure.

Figure 4:
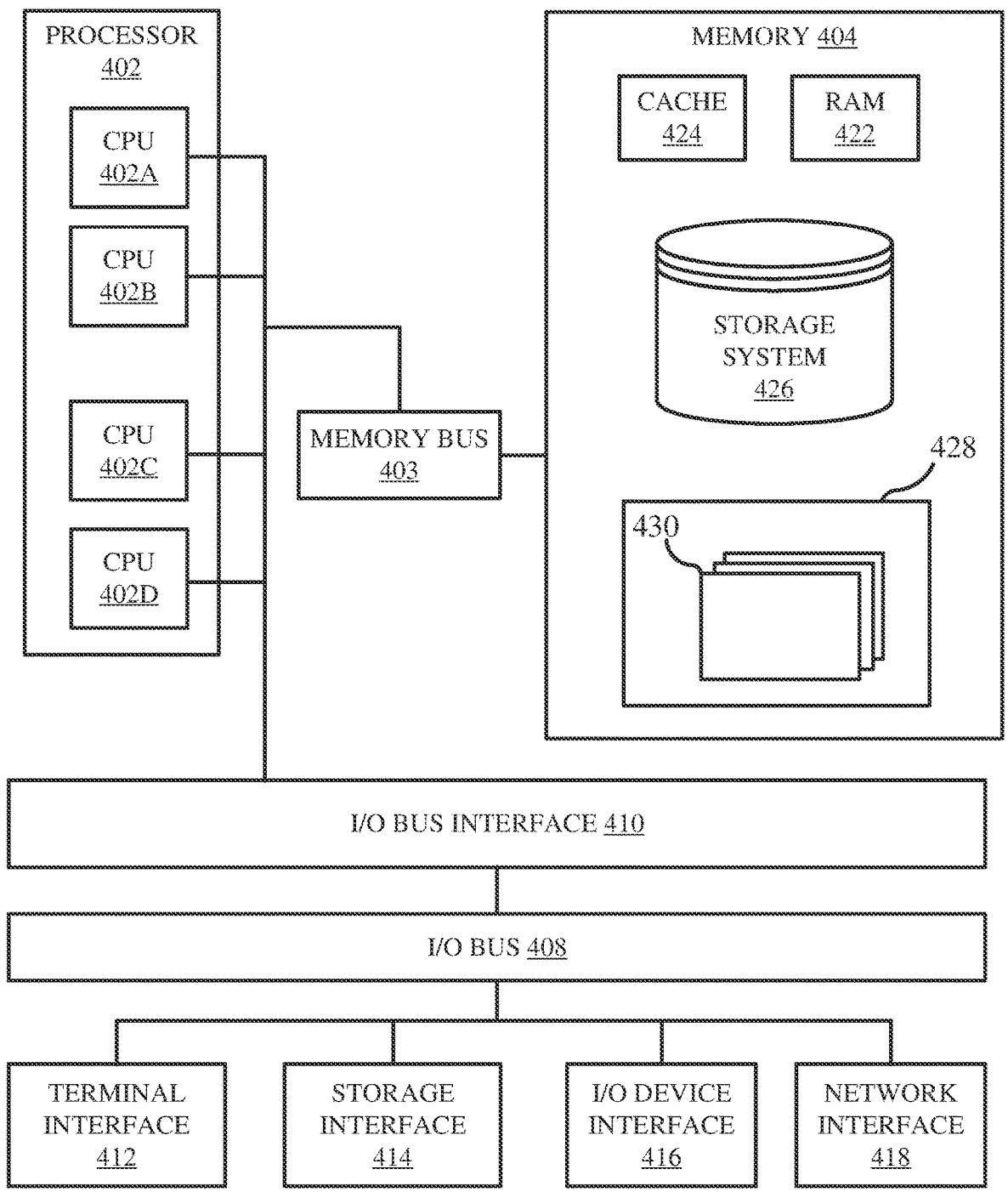
FIG. 4 is a high-level block diagram illustrating an example computer system that can be used in implementing one or more of the methods, tools, modules, and any related functions described herein, in accordance with embodiments of the present disclosure.

Referring now to FIG. 4, shown is a high-level block diagram of an example computer system 401 that may be utilized in various devices discussed herein (e.g., devices 105, server 135, stream quality management system 200, user device 225, edge processing devices 255, etc.) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402 (also referred to as processors herein), a memory 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

Memory 404 may include computer system readable media in the form of volatile memory, such as random-access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
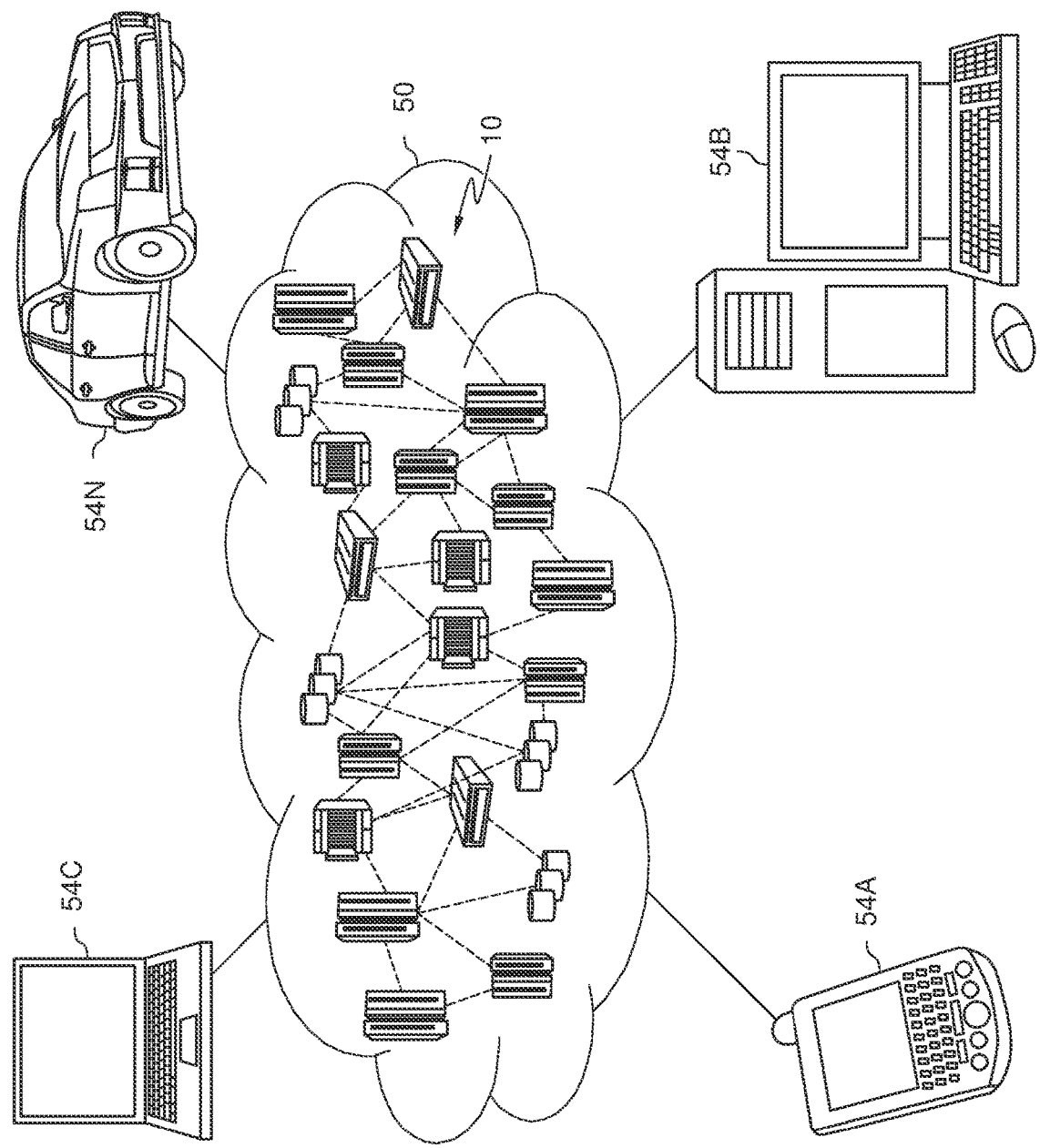
FIG. 5 is a diagram illustrating a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
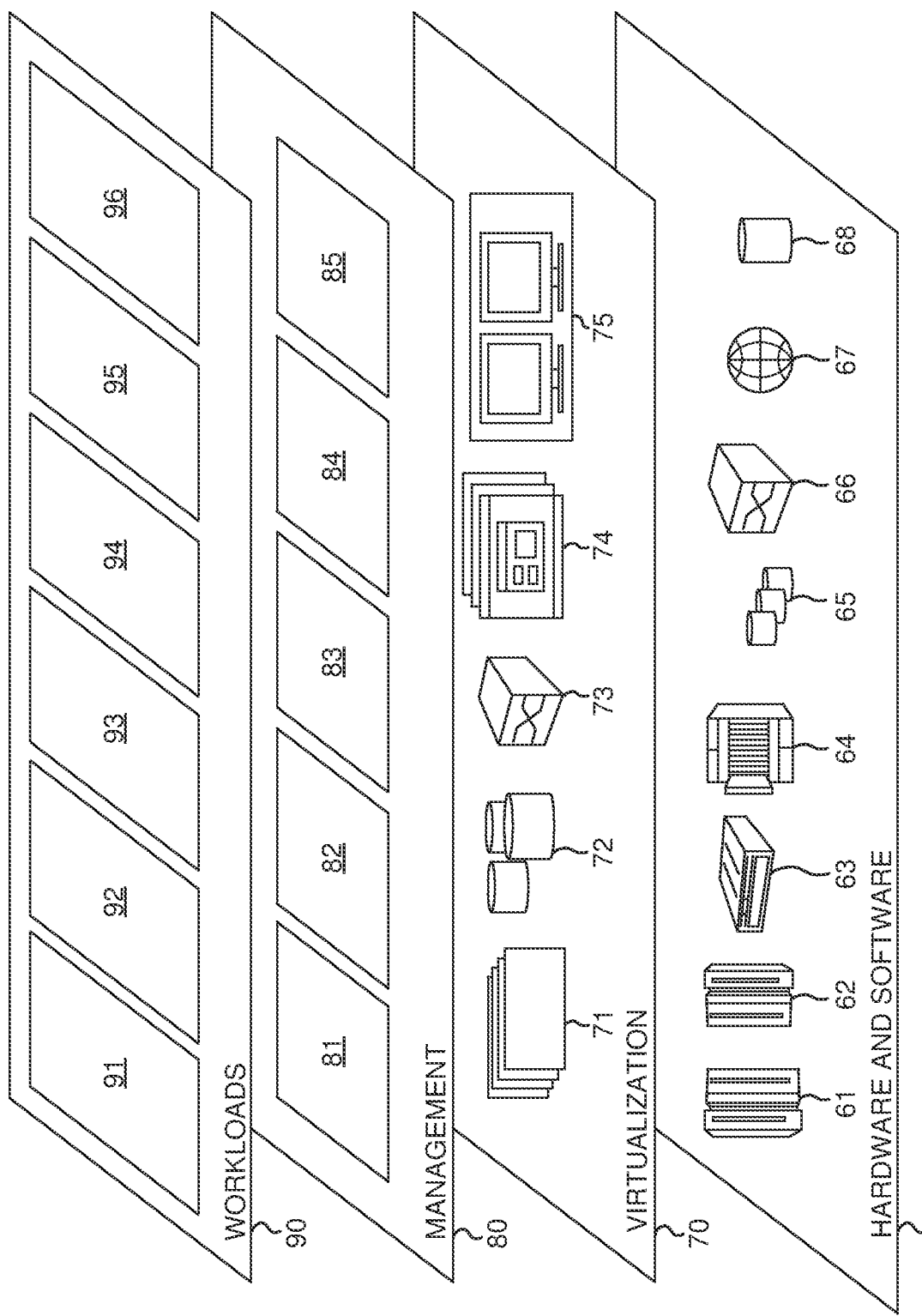
FIG. 6 is a block diagram illustrating abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and stream quality management 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
    determining that quality of an audio/video (A/V) stream being streamed to a first device falls below a quality threshold;
    identifying a plurality of edge processing devices in an environment of the first device;
    determining available computing resources of each of the edge processing devices;
    selecting at least one edge processing device of the plurality of edge processing devices with sufficient computing resources for correcting quality of the A/V stream using a generative adversarial network (GAN) model;
    instructing the selected at least one edge processing device to correct the A/V stream using the GAN model to generate a corrected A/V stream, wherein generating the corrected A/V stream further comprises:
        generating, by the GAN model, high resolution frames for the corrected A/V stream using low resolution frames of the A/V stream as inputs, wherein the corrected A/V stream satisfies the quality threshold; and
    issuing a command to transmit the corrected A/V stream to the first device.

2. The method of claim 1, wherein the GAN model includes a generator model parameterized by a first set of weights and biases configured to generate the high resolution frames for the corrected A/V stream using the low resolution frames of the A/V stream as inputs.

3. The method of claim 2, wherein the GAN model includes a discriminator model parameterized by a second set of weights and biases configured to discriminate between the high resolution frames generated by the generator model and real high resolution images.

4. The method of claim 1, wherein determining available computing resources of each of the edge processing devices includes determining available memory resources of each edge processing device, determining available processing resources of each edge processing device, and determining available network resources of each edge processing device.

5. The method of claim 4, wherein selecting the at least one edge processing device of the plurality of edge processing devices with sufficient computing resources for correcting quality of the A/V stream using the GAN model includes determining that the at least one edge processing device has a minimum amount of available memory resources, a minimum amount of available processing resources, and a minimum amount of available network resources for correcting the A/V stream using the GAN model and for transmitting the corrected A/V stream back to the first device.

6. The method of claim 1, wherein the selecting at least one edge processing device of the plurality of edge processing devices with sufficient computing resources for correcting quality of the A/V stream using the GAN model includes selecting at least two edge processing devices with sufficient computing resources for cooperatively correcting quality of the A/V stream.

7. The method of claim 6, wherein a first edge processing device of the at least two edge processing devices corrects a first portion of the A/V stream, wherein a second edge processing device of the at least two edge processing devices corrects a second portion of the A/V stream, wherein the first portion and the second portion are collated to generate the corrected A/V stream prior to transmission to the first device.

8. The method of claim 1, wherein determining that the quality of the A/V stream being streamed to the first device falls below the quality threshold includes:
    determining a resolution, frame rate, or bit rate of the A/V stream; and
    comparing the resolution, frame rate, or bit rate to a respective resolution threshold, frame rate threshold, or bit rate threshold.

9. A system comprising:
one or more processors; and
one or more computer-readable storage media collectively storing program instructions which, when executed by the one or more processors, are configured to cause the one or more processors to perform a method comprising:
determining that quality of an audio/video (A/V) stream being streamed to a first device falls below a quality threshold;
identifying a plurality of edge processing devices in an environment of the first device;
determining available computing resources of each of the edge processing devices;
selecting at least one edge processing device of the plurality of edge processing devices with sufficient computing resources for correcting quality of the A/V stream using a generative adversarial network (GAN) model;
instructing the selected at least one edge processing device to correct the A/V stream using the GAN model to generate a corrected A/V stream, wherein generating the corrected A/V stream further comprises:
generating, by the GAN model, high resolution frames for the corrected A/V stream using low resolution frames of the A/V stream as inputs, wherein the corrected A/V stream satisfies the quality threshold; and
issuing a command to transmit the corrected A/V stream to the first device.

10. The system of claim 9, wherein the GAN model includes a generator model parameterized by a first set of weights and biases configured to generate the high resolution frames for the corrected A/V stream using the low resolution frames of the A/V stream as inputs, wherein the GAN model includes a discriminator model parameterized by a second set of weights and biases configured to discriminate between the high resolution frames generated by the generator model and real high resolution images.

11. A computer program product comprising one or more computer readable storage media, and program instructions collectively stored on the one or more computer readable storage media, the program instructions comprising instructions configured to cause one or more processors to perform a method comprising:
determining that quality of an audio/video (A/V) stream being streamed to a first device falls below a quality threshold;
identifying a plurality of edge processing devices in an environment of the first device;
determining available computing resources of each of the edge processing devices;
selecting at least one edge processing device of the plurality of edge processing devices with sufficient computing resources for correcting quality of the A/V stream using a generative adversarial network (GAN) model;
instructing the selected at least one edge processing device to correct the A/V stream using the GAN model to generate a corrected A/V stream, wherein generating the corrected A/V stream further comprises:
generating, by the GAN model, high resolution frames for the corrected A/V stream using low resolution frames of the A/V stream as inputs, wherein the corrected A/V stream satisfies the quality threshold; and
issuing a command to transmit the corrected A/V stream to the first device.

12. The computer program product of claim 11, wherein the GAN model includes a generator model parameterized by a first set of weights and biases configured to generate the high resolution frames for the corrected A/V stream using the low resolution frames of the A/V stream as inputs.

13. The computer program product of claim 12, wherein the GAN model includes a discriminator model parameterized by a second set of weights and biases configured to discriminate between the high resolution frames generated by the generator model and real high resolution images.

14. The computer program product of claim 11, wherein determining available computing resources of each of the edge processing devices includes determining available memory resources of each edge processing device, determining available processing resources of each edge processing device, and determining available network resources of each edge processing device.

15. The computer program product of claim 14, wherein selecting the at least one edge processing device of the plurality of edge processing devices with sufficient computing resources for correcting quality of the A/V stream using the GAN model includes determining that the at least one edge processing device has a minimum amount of available memory resources, a minimum amount of available processing resources, and a minimum amount of available network resources for correcting the A/V stream using the GAN model and for transmitting the corrected A/V stream back to the first device.

16. The computer program product of claim 11, wherein the selecting at least one edge processing device of the plurality of edge processing devices with sufficient computing resources for correcting quality of the A/V stream using the GAN model includes selecting at least two edge processing devices with sufficient computing resources for cooperatively correcting quality of the A/V stream.

17. The computer program product of claim 16, wherein a first edge processing device of the at least two edge processing devices corrects a first portion of the A/V stream, wherein a second edge processing device of the at least two edge processing devices corrects a second portion of the A/V stream, wherein the first portion and the second portion are collated to generate the corrected A/V stream prior to transmission to the first device.

18. The computer program product of claim 11, wherein determining that the quality of the A/V stream being streamed to the first device falls below the quality threshold includes:
determining a resolution, frame rate, or bit rate of the A/V stream; and
comparing the resolution, frame rate, or bit rate to a respective resolution threshold, frame rate threshold, or bit rate threshold.

* * * * *